US 6,660,424 B1

(12) United States Patent
Gyoten et al.

(10) Patent No.: US 6,660,424 B1
(45) Date of Patent: Dec. 9, 2003

(54) FUEL CELL AND METHOD OF MANUFACTURE THEREOF

(75) Inventors: Hisaaki Gyoten, Shijonawate (JP); Eiichi Yasumoto, Katano (JP); Makoto Uchida, Hirakata (JP); Yasushi Sugawara, Settsu (JP); Kazufumi Nishida, Moriguchi (JP); Kazuhito Hatoh, Osaka (JP); Yukiyoshi Ono, Hirakata (JP); Hideo Ohara, Katano (JP); Junji Morita, Moriguchi (JP); Yasuo Takebe, Katano (JP); Teruhisa Kanbara, Ikeda (JP); Osamu Sakai, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/763,263
(22) PCT Filed: Aug. 9, 1999
(86) PCT No.: PCT/JP99/04312
§ 371 (c)(1),
(2), (4) Date: Feb. 20, 2001
(87) PCT Pub. No.: WO00/11741
PCT Pub. Date: Mar. 2, 2000

(30) Foreign Application Priority Data

Aug. 20, 1998 (JP) ............................... 10-234374
Feb. 9, 1999 (JP) ............................... 11-030952

(51) Int. Cl.⁷ .................................... H01M 2/14
(52) U.S. Cl. .................... 429/38; 429/39; 429/32; 429/40; 429/42; 429/44; 29/623.5
(58) Field of Search ................. 429/38, 39, 32, 429/40, 42, 44; 29/623.5

(56) References Cited

U.S. PATENT DOCUMENTS 6,127,059 A * 10/2000 Kato ........................ 429/44

FOREIGN PATENT DOCUMENTS

| JP | 07037592 A | 2/1995 |
| JP | 07211324 A | 8/1995 |
| JP | 8-261790 | 10/1996 |
| JP | 08261790 A | 10/1996 |
| JP | 09228063 A | 9/1997 |
| JP | 10189002 A | 7/1998 |

* cited by examiner

*Primary Examiner*—Bruce F. Bell
(74) *Attorney, Agent, or Firm*—Akin Gump Strauss Hauer & Feld L.L.P.

(57) ABSTRACT

The specification discloses a fuel cell comprising stacked unit cells, each of the unit cells including a pair of electrodes having a catalytic reaction layer and a gas diffusion layer, an electrolyte layer disposed between the pair of electrodes, a separator having a flow path for supplying a fuel gas to one electrode and a separator having a flow path for supplying an oxidant gas to the other electrode, the separators being placed on the outer side of the electrodes and the unit cells being stacked with the separators placed therebetween, wherein at least the catalytic reaction layer, the gas diffusion layer or the flow path has water-repelling properties. Thereby, a fuel cell having a superior cell performance is obtained.

7 Claims, 9 Drawing Sheets

F I G. 5
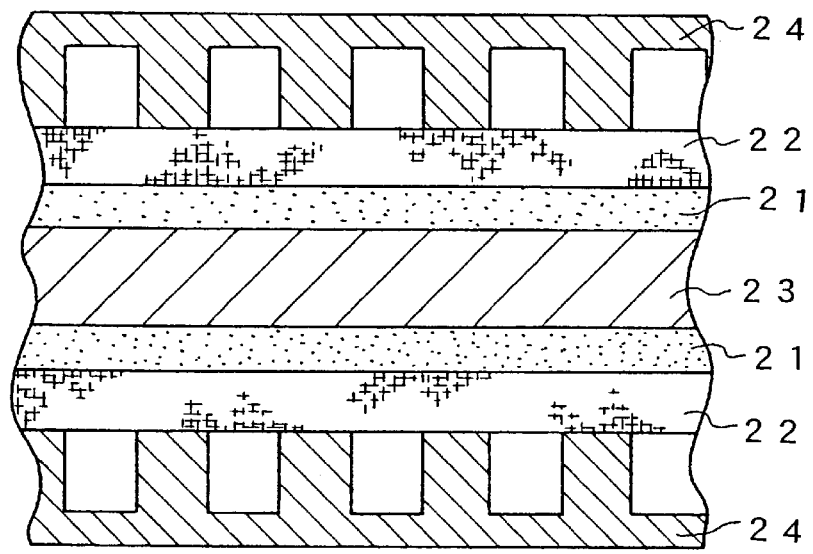

F I G. 6
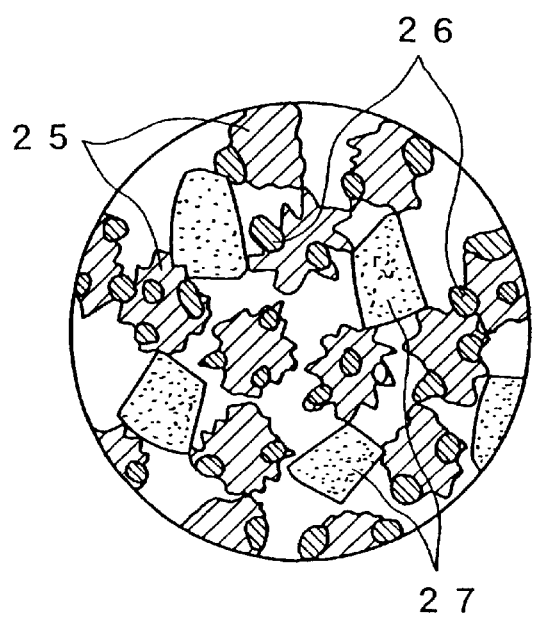

FUEL CELL AND METHOD OF MANUFACTURE THEREOF

TECHNICAL FIELD

The present invention relates to a fuel cell for operation at normal temperature, which is used in portable power sources, power sources of distribution type, power sources for electric vehicles, power source systems for home and cogeneration systems and the like.

BACKGROUND ART

A fuel cell provides electricity and heat at the same time by electrochemically reacting a fuel gas such as hydrogen with an oxidant gas such as air in catalytic layers of electrodes. As an electrolyte for disposing between the electrodes, SiC matrix material impregnated with phosphoric acid is used in a phosphoric type fuel cell. In a polymer electrolyte fuel cell, perfluorocarbon sulfonic acid membrane is used. On both surfaces of the electrolyte, catalytic reaction layers (hereinafter simply referred to as "catalytic layers") of the electrodes, which are mainly composed of a carbon powder with a platinum type metallic catalyst carried thereon, are formed in close adhesion. Further, on the outer surfaces of the catalytic reaction layers, a pair of electrode base materials having gas permeability and electrical conductivity are placed in close adhesion. These base materials and the catalytic layers constitute the electrodes. This assembly of the electrodes and the electrolyte is called membrane electrode assembly (MEA). Moreover, on the outside of the electrodes, electrically conductive separator plates for mechanically fixing the MEAs and electrically connecting in series adjacent MEAs with each other are placed.

Generally, carbon fiber is used for the electrode base material and carbon is used for the separator plate. In the portion where the separator plate is in contact with the electrode, a gas flow path for supplying a reaction gas to the electrode surface and for exhausting a generated gas and an excess gas is formed.

At the electrode into which hydrogen is supplied, hydrogen, which is supplied from the gas flow path to the catalytic layer through the electrode base material, is oxidized and transformed into a hydrogen ion to come into the phosphoric acid solution. On the other electrode in which air is supplied, oxygen is reacted with a hydrogen ion in the phosphoric acid solution to generate water. As a result, an electron flows from the hydrogen side electrode to the air side electrode through the outer circuit to generate electric power. Accordingly, it is necessary to secure a route for supplying reaction gases such as hydrogen and air to respective catalytic layers and for removing drain gases such as water vapor.

In a solid polymer electrolyte fuel cell, for example, reaction gases are supplied after moistened in order to maintain the water-containing state of the polymer electrolyte membrane to saturation. Meanwhile, a reaction-generated water generates along with the electric generation reaction, and the reaction-generated water is added to the reaction gases supplied after moistened. As a result, the concentration of the reaction gases lowers with water vapor and, therefore, it is necessary to supply a large quantity of gases to the reaction sites on the electrodes and inside the catalytic layers in order to realize a high output.

For such a reason, water-repelling treatment has conventionally been carried out by applying a water-repelling agent such as a fluoric polymer, e.g. polytetrafluoroethylene on the catalytic layers, the electrode base materials, and the surfaces of the gas flow paths on the separator plates. It is considered that such water-repelling agent has a role of preventing the phosphoric acid solution impregnated in SiC matrix from leaking outside the cell.

The water-repelling agent such as a fluoric polymer has conventionally been applied to a predetermined portion in the following manner. For example, a colloidal dispersion of a fluoric polymer is impregnated and applied to the carbon fiber papers and the gas flow paths on the separators and, then, the solvent is removed by drying. Subsequently, by the thermal treatment at 350 to 450° C., the fluoric polymer is adhered and fixed to the carbon fibers and the gas flow paths on the separators.

As for the catalytic layers, a mixture of a carbon powder to which a water-repelling agent of a fluoric polymer had been adhered and fixed beforehand and a platinum-carrying carbon powder has been used for forming the catalytic layers. As the above-mentioned fluoric polymer, in addition to PTFE, fluoric polymers modified with a variety of substituent groups such as perfluoromethyl group to change properties such as the glass transition point.

Furthermore, there is a solid polymer electrolyte fuel cell as a solution type fuel cell in addition to the phosphoric acid type fuel cell, and a water-repelling agent is applicable to the catalytic layers and the electrode base materials therein in the same manner.

However, fluoric polymers such as PTFE have a contact angle to water of 110° or smaller, and thus have insufficient water-repelling properties. For example, when the output takes place at a high current density thereby to generate a large quantity of water, or when the gas flow amount is made small, the removal of generated water or condensed water is difficult depending on the operation conditions of the cell, which leads to deterioration in the cell performance. Further, such fluoric polymers exhibit insufficient adhesion to a carbon material, and there has been a problem that the fluoric polymers flow out and the water-repelling properties gradually decrease during long-term operations.

For this reason, in order to achieve a cell having a higher performance, it is desirable to use a water-repelling agent having a greater contact angle to water and high water-repelling properties. Further, in order to efficiently apply the water-repelling agent to a surface to be treated, a colloidal dispersion of the water-repelling agent needs to be thermally treated at a high temperature of 350° C. or higher after being applied and dried. However, according to this method, it is necessary to use a water-repelling agent having a high heat resistance.

On the other hand, for the water-repelling treatment of a material having a low heat resistance, it is necessary to use a colloidal dispersion of a water-repelling agent in the applied and dried state. However, since the water-repelling agent is not adhered and fixed onto the surface to be treated, there is a possibility that the water-repelling agent comes off to cause deterioration in the water-repelling properties after long-time operations of the cell. Moreover, in such a method, it is difficult to give water-repelling treatment only to the portions intended to be treated, for example, to treat only one surface of the electrode base material.

DISCLOSURE OF INVENTION

In order to solve the problems as described above, in a fuel cell obtained by laminating unit cells, each of the unit cells including a pair of electrodes having a catalytic layer and a gas diffusion layer, an electrolyte layer disposed between the pair of electrodes, a separator having a flow path for supplying a fuel gas to one of the electrodes and a separator having a flow path for supplying an oxidant gas to the other electrode, wherein the separators are placed on the outside of the electrodes and the unit cells are stacked with the separators placed between each thereof, the present invention provides at least the catalytic layer, the gas diffusion layer or the supply path surface is provided with water-repelling property.

It is possible to give water-repelling property to the catalytic layer, the gas diffusion layer or the flow path surface by using a water-repelling agent containing a silane compound having a hydrophobic group and a functional group, or a water-repelling agent comprising a non-polymeric compound containing a fluorine atom and a carbon atom to carry out the water-repelling treatment.

Such silane compound has preferably a hydrophobic group and a functional group, and has preferably at least either one of a hydrocarbon chain and a fluorocarbon chain on at least either one of the principal chain and the side chain of the hydrophobic group.

The silane compound is preferably a compound represented by the formula: $CF_3-(CF_2)_7-(CH_2)_2-Si(OCH_3)_3$.

Further, as the water-repelling agent comprising a non-polymeric compound containing a fluorine atom and a carbon atom, it is preferable to use a water-repelling agent comprising a fluorinated pitch and a solvent.

The pitch has preferably an average molecular weight of 500 to 10000, and the ratio of fluorine atom to carbon atom (F/C) contained in the pitch is preferably from 1.25 to 1.65.

Moreover, the ratio of the fluorine atom to the hydrogen atom (F/H) is preferably 9 or over, and the contact angle of the fluorinated pitch to water is preferably 130° or greater.

Furthermore, the fluorinated pitch may be synthesized by fluorinating directly a carbon type pitch or an oil type pitch.

On the other hand, the electrolyte layer preferably comprises a solid polymer membrane.

Moreover, the present invention also relates to a method for producing a fuel cell comprising stacked unit cells, each of the unit cells including a pair of electrodes having a catalytic layer and a gas diffusion layer, an electrolyte layer disposed between the pair of electrodes, a separator having a flow path for supplying a fuel gas to one electrode and a separator having a flow path for supplying an oxidant gas to the other electrode, the separators being placed on the outside of the electrodes and the unit cells being stacked with the separators placed therebetween, the method comprising the steps of (a) applying a water-repelling agent comprising a silane compound and a solvent or a water-repelling agent comprising a fluorinated pitch and a solvent to at least a material, which constitutes the catalyst layer, the gas diffusion layer or the flow path surface, and (b) drying and removing the solvent to make the silane compound or the fluorinated pitch adhered and fixed.

Still further, the present invention relates to a method for the production of a fuel cell comprising stacked unit cells, each of the unit cells including a pair of electrodes having a catalytic layer and a gas diffusion layer, an electrolyte layer disposed between the pair of electrodes, a separator having a flow path for supplying a fuel gas to one electrode and a separator having a flow path for supplying an oxidant gas to the other electrode, the separators being placed on the outside of the electrodes and the unit cells being stacked with the separators placed between each thereof, said method comprising a step of vapor-depositing the fluorinated pitch onto at least a material, which constitutes the catalytic layer, gas diffusion layer or the flow path surface.

In this case, it is effective to comprise a step of vapor-depositing a fluorinated pitch to the interface between the catalytic layer and the gas diffusion layer.

BRIEF DESCRIPTION OF DRAWINGS

FIG. 5 is a schematic cross-sectional view showing the configuration of a unit cell of a fuel cell prepared in Example 3.

FIG. 6 is a schematic view showing the configuration of a catalytic layer of an electrode of a fuel cell prepared in Example 3.

BEST MODE FOR CARRYING OUT THE INVENTION

Figure 1:
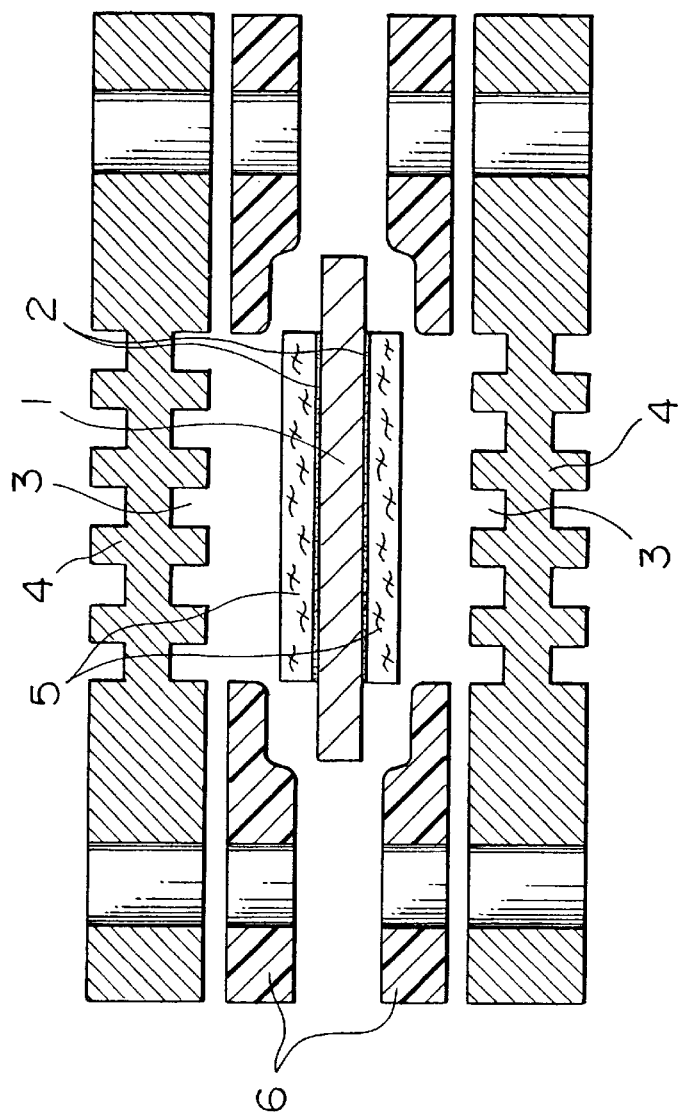
FIG. 1 is a schematic cross-sectional view showing the configuration of a unit cell of a fuel cell prepared in Example 1.

The present invention provides a fuel cell comprising stacked unit cells, each of the unit cells including a pair of electrodes having a catalytic reaction layer and a gas diffusion layer, an electrolyte layer disposed between the pair of electrodes, a separator having a flow path for supplying a fuel gas to one electrode and a separator having a flow path for supplying an oxidant gas to the other electrode, the separators being placed on the outside of the electrodes and the unit cells being stacked with the separators placed between each thereof, wherein water-repelling property is given to at least the catalytic layer, the gas diffusion layer or the flow path surface. It is effective, of course, to give water-repelling property to two or more of the catalytic layer, the gas diffusion layer and the flow path surface, or to all of them.

Accordingly, the present invention intends to improve the performance of the fuel cell by using, instead of the conventionally used fluoric polymer, a silane compound having a greater contact angle, or a non-polymeric compound containing a fluorine atom and a carbon atom such as fluorinated graphite and a higher cyclic hydrocarbon fluoride.

As those which can give water-repelling property to the catalytic layer, the gas diffusion layer or the flow path surface, there can be mentioned water-repelling agents containing a silane compound having a hydrophobic group and a functional group, or water-repelling agents containing a compound having a fluorine atom and a carbon atom. By applying these water-repelling agents by means of impregnation, application or vapor-deposition, excellent water-repelling property is given to the catalytic layer, the gas diffusion layer, or the flow path surface.

In first, water-repelling agents containing a silane compound having a hydrophobic group and a functional group will be described.

The silane compound mentioned here has a hydrophobic group and a functional group, and it bounds chemically at the functional group moiety when applied to the catalytic layer, the gas diffusion layer or the flow path surface. Then it exerts water-repelling property by the hydrophobic moiety.

As the functional group, there is no special restriction as long as those which can chemically bound to a material, which constitutes the catalytic layers, the gas diffusion layers or the flow path surface, and there can be mentioned, for example, methoxy group, ethoxy group, propoxy group, butoxy group and the like. Particularly, the methoxy group is preferable from the viewpoint that it is superior in the reactivity.

In particular, considering the case in which the functional group has hydrophilicity, the hydrophobic group preferably contains at least one of a hydrocarbon chain and a fluorocarbon chain on at least either one of the principal chain and the side chain thereof.

Specifically, as the silane compound, it is preferable to use a compound represented by the formula:

$CF_3-(CF_2)_7-(CH_2)_2-Si(OCH_3)_3$.

As a method for applying the silane compound to the catalytic layer, the gas diffusion layer or the flow path surface by water-repelling treatment, in the case in which a gas diffusion layer comprising carbon paper or the like is employed, for example, a hydroxyl group containing an active hydrogen may be introduced to the gas diffusion layer by a plasma treatment to make the hydroxyl group chemically bound to the functional group.

Next, the other water-repelling agents which contain a non-polymeric compound having a fluorine atom and a carbon atom will be described.

The non-polymeric compound mentioned here chemically bounds to the catalytic layer, the gas diffusion layer or the flow path surface at the fluorine atom moiety, which serves as a functional group. Accordingly, a higher cyclic hydrocarbon fluoride may also be used in addition to the fluorinated graphite.

Above all, a fluorinated pitch containing a higher cyclic hydrocarbon fluoride is preferable because it dissolves well in a fluoric solvent such as perfluorobenzene, and it adheres and fixes to a material to be treated only by application and drying, and further it does not easily come off by the gas flow.

Moreover, since the fluorinated pitch has a molecular weight of several thousands, which is much less than that of a polymer, and since it is in the form of a mass, not like a polymer in the form of a thread, it can be turned into a gas with an increased temperature. As a result, by vapor-deposition, only a portion desired to be treated, for example only one surface of the diffusion layer of the electrode, can be subjected to water-repelling treatment, and thereby the performance of the fuel cell can be improved.

Herein, the pitch generally contains higher cyclic hydrocarbons such as fluoranslene ($C_{15}H_{16}$), pyrene ($C_{10}H_{10}$) and chrysene ($C_{18}H_{12}$).

On the contrary thereto, as the fluorinated pitch used in the present invention, an oil type pitch may be used as it is depending on the kind thereof. Further, the fluorinated pitch may be obtained by directly fluorinating an oil type pitch.

Such direct fluorination may be carried out by blowing in fluoric gas while heating the oil type pitch.

As the oil type pitch, it is preferable to use a pitch containing a compound having a plane structure in which the carbon skeleton has 6 ring members and the 6 ring members are stacked.

The average molecular weight of the fluorinated pitch is preferably 500 to 10000.

Further, the ratio of fluorine atom to carbon atom (F/C) contained in the fluorinated pitch is particularly preferable from 1.25 to 1.65.

Moreover, the ratio of fluorine atom to hydrogen atom (F/H) contained in the fluorinated pitch is preferably 9 or over.

Still further, the contact angle to water of the fluorinated pitch is preferably 130° or greater because a sufficient water-repelling property should be given.

As a method for applying a non-polymeric compound containing a fluorine atom and a carbon atom to the catalytic layer, the gas diffusion layer or the flow path surface by water-repelling treatment, in the case in which a gas diffusion layer comprising carbon paper is employed, for example, a water-repelling agent containing a non-polymeric compound having a fluorine atom and a carbon atom and a solvent may be impregnated into a material, which constitutes the gas diffusion layer, and dried to have a chemical bond at the fluorine atom moiety.

Furthermore, in the fuel cell of the present invention, a solid polymer membrane can be used as the electrolyte layer. That is, the present invention also relates to a solid polymer electrolyte fuel cell.

In addition, the present invention provides a method for producing a fuel cell comprising the steps of: (a) applying a water-repelling agent comprising a silane compound and a solvent, or a water-repelling agent comprising a fluorinated pitch and a solvent to at least a material, which constitutes the catalytic layer, the gas diffusion layer or the flow path surface; and (b) adhering and fixing the silane compound or the fluorinated pitch by drying and removing the solvent.

As specific conditions in the step (a) and the step (b), a conventionally known method may be followed except for the previously described conditions.

Further, the present invention relates to the method for producing a fuel cell as described above, further comprising a step of vapor-depositing a fluorinated pitch onto at least a material, which constitutes the catalytic layer, gas diffusion layer or the flow path surface.

In this case, a step of vapor-depositing the fluorinated pitch to the interface between the catalytic layer and the gas diffusion layer may be included. With this measure, the water-repelling property may be further improved.

Herein, technical matters other than the characteristic of the present invention as described on the foregoing may be similar to those of the conventional fuel cell.

The present invention will be described more specifically with reference to examples below, but the present invention should not be limited thereto.

EXAMPLES

Example 1 and Comparative Example 1

FIG. 1 is a schematic cross-sectional view showing the configuration of a unit cell of a fuel cell employed in this example.

Acetylene black type carbon powder was made to carry 25% by weight of platinum particles having an average particle diameter of about 30 Å, which served as a catalyst of the electrodes. A dispersion was prepared by dispersing this catalyst powder into isopropanol, which was then mixed with a dispersion prepared by dispersing a powder of perfluorocarbon sulfonate into ethyl alcohol, thereby obtaining a paste.

Next, a non-woven carbon fabric serving as an electrode base material having a catalytic layer and a diffusion layer was subjected to water-repelling treatment using a silane compound. For the water-repelling treatment, after a non-woven carbon fabric having a thickness of 400 μm was subjected to the plasma treatment at 300 W for 5 minutes in first, a hydroxyl group containing an active hydrogen was given to the non-woven carbon fabric. Next, 5% by weight of $CF_3(CF_2)_7(CH_2)_2Si(OCH_3)_3$/methanol solution was prepared, and the non-woven carbon fabric subjected to the above surface treatment was impregnated therewith. After dried at room temperature for 1 hour, the non-woven carbon fabric was sintered at 100° C. for 15 minutes, thereby a water-repelling layer comprising $CF_3(CF_2)_7(CH_2)_2Si(OCH_3)_3$ having a covalent bond with a siloxane bond was formed on the surface of the non-woven carbon fabric.

As a comparative example to Example 1, a non-woven carbon fabric subjected to the water-repelling treatment with PTFE was prepared. Specifically, the above-mentioned carbon paper was impregnated with an aqueous dispersion of polytetrafluoroethylene, then dried and thermally treated at 400° C. for 30 minutes to give water-repelling property to the carbon paper.

Two pieces of non-woven carbon fabric subjected to the water-repelling treatment as above were prepared, and a catalytic layer 2 was formed on one surface of each non-woven fabric by a screen printing method using the previously-mentioned paste as a raw material. The amount of the platinum and the perfluorocarbon sulfonate were adjusted to 0.5 mg/cm$^2$ and 1.2 mg/cm$^2$, respectively.

The two pieces of non-woven carbon fabric electrode 5 were directed and stacked so that the respective catalytic layer 2 came inside, while they were made to sandwich a polymer electrolyte membrane 1 comprising a perfluorocarbon sulfonic acid resin having a thickness of 50 μm is disposed therebetween, and then dried.

Herein, the non-woven carbon fabric electrodes 5 have a length and the width of both 10 cm, and they were placed in the center of the polymer electrolyte membrane 1 having a length and a width of both 12 cm.

In an assembly of the non-woven carbon fabric electrodes 5 and the polymer electrolyte membrane 1, it was confirmed that the polymer electrolyte membrane 1 and the non-woven carbon fabric electrodes 5 were combined by the catalytic layer composed of the platinum-carrying carbon powder and the polymer electrolyte membrane 1.

The assembly of the non-woven carbon fabric electrodes 5 and the polymer electrolyte membrane 1 were made to be sandwiched on the both surfaces by separators 4, which were made of carbon and impregnated with a phenolic resin to suppress gas permeability, thereby a unit cell was obtained. The separators 4 have a thickness of 4 mm, and on the surface thereof, numerous gas flow paths 3 having a width and a depth of both 1 mm were provided by carving in one direction by the machine tool cutting.

Herein, in order to electrically insulate the separators 4 from the polymer electrolyte membrane 1 and also to suppress gas leakage in the inside, a sheet made of fluoric resin serving as a sealant 6, was sandwiched between them.

Figure 2:
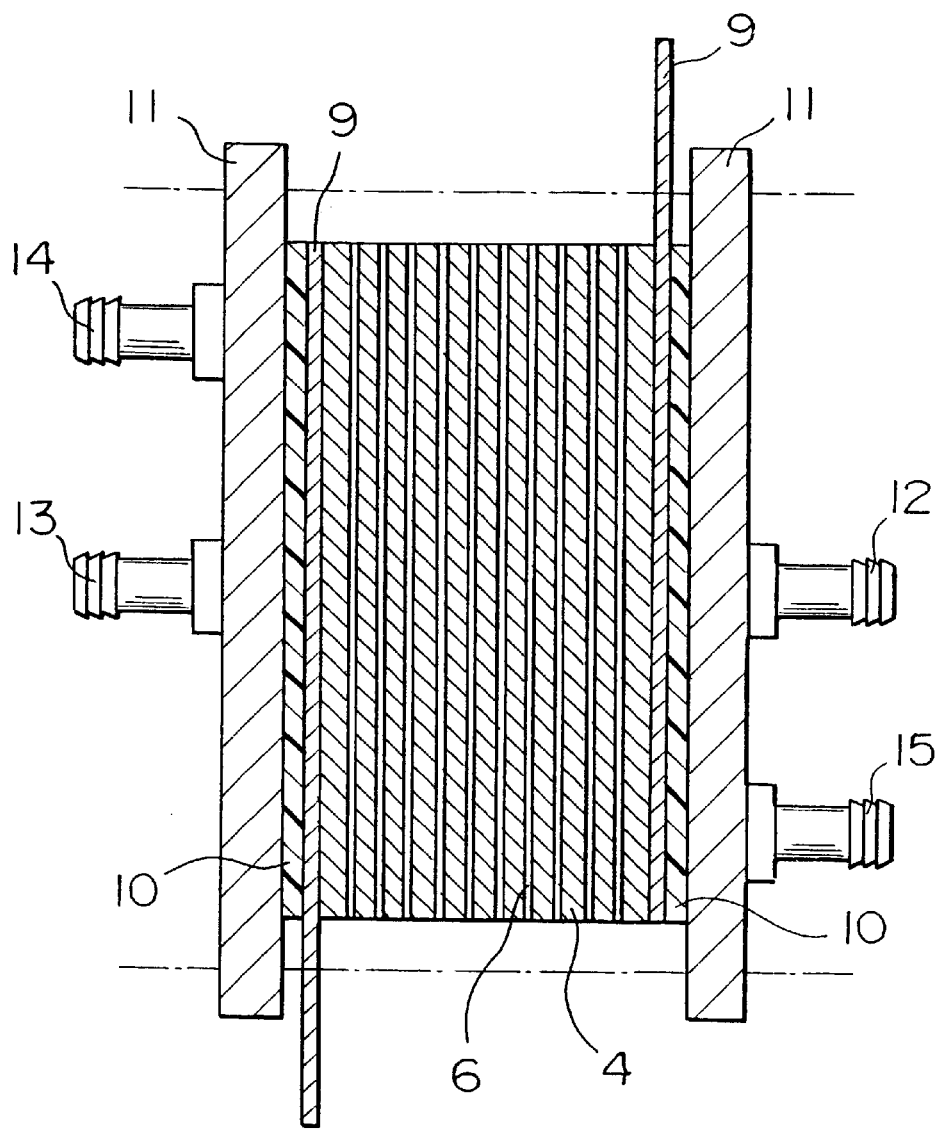
FIG. 2 is a schematic cross-sectional view showing a fuel cell prepared in Example 1.

Using the materials as described above, a fuel cell (cell stack) as shown in FIG. 2 was configured. FIG. 2 is a schematic longitudinal cross-sectional view of a fuel cell prepared in this example. In the direction to which unit cells are stacked in the cell stack, end plates 11 also serving as cooling plates, were placed on top and bottom surfaces of the cell stack, and a pressure of 10 kgf/cm$^2$ was applied and maintained in the direction of the lamination. A hydrogen gas and air were supplied to the anode and to the cathode, respectively, so that the utilization rates of the hydrogen gas and air were 70% and 20%, respectively. Further, in the respective gas supply parts, a temperature controlling device and a humidifying device were provided, and the temperatures of the supplied gases were adjusted to be basically the same as the cell temperature, and the humidities were adjusted so that the supplied gases have dew points lower by 15 to 35° C. than the cell temperature.

Figure 3:
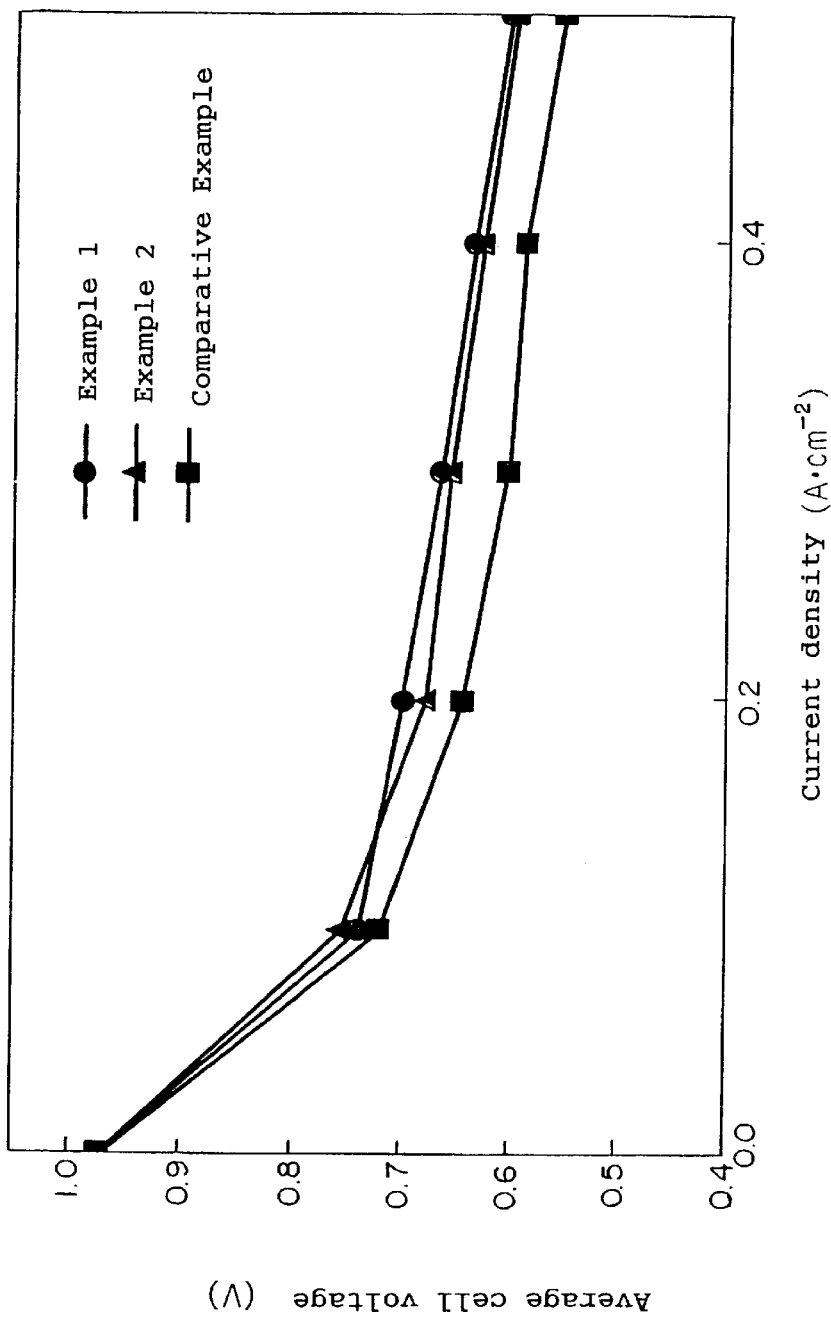
FIG. 3 is a graph showing the current-voltage characteristics of fuel cells obtained in Example 1 and 2, and Comparative Example 1.

FIG. 3 shows the current-voltage characteristics of the fuel cell obtained in this example. However, as a cell for the evaluation of the characteristics, a cell stack of 10 unit cells of FIG. 2 were used. In FIG. 3, the fuel cell produced as Comparative Example 1 in which the non-woven carbon fabric was subjected to the water-repelling treatment using polytetrafluoroethylene had a greatly decreased performance when the output took place at a high current density. On the contrary thereto, it was found that the cell of this example in which the diffusion layer was subjected to the water-repelling treatment with the silane compound maintained a high performance even when the output took place at a high current density.

Figure 4:
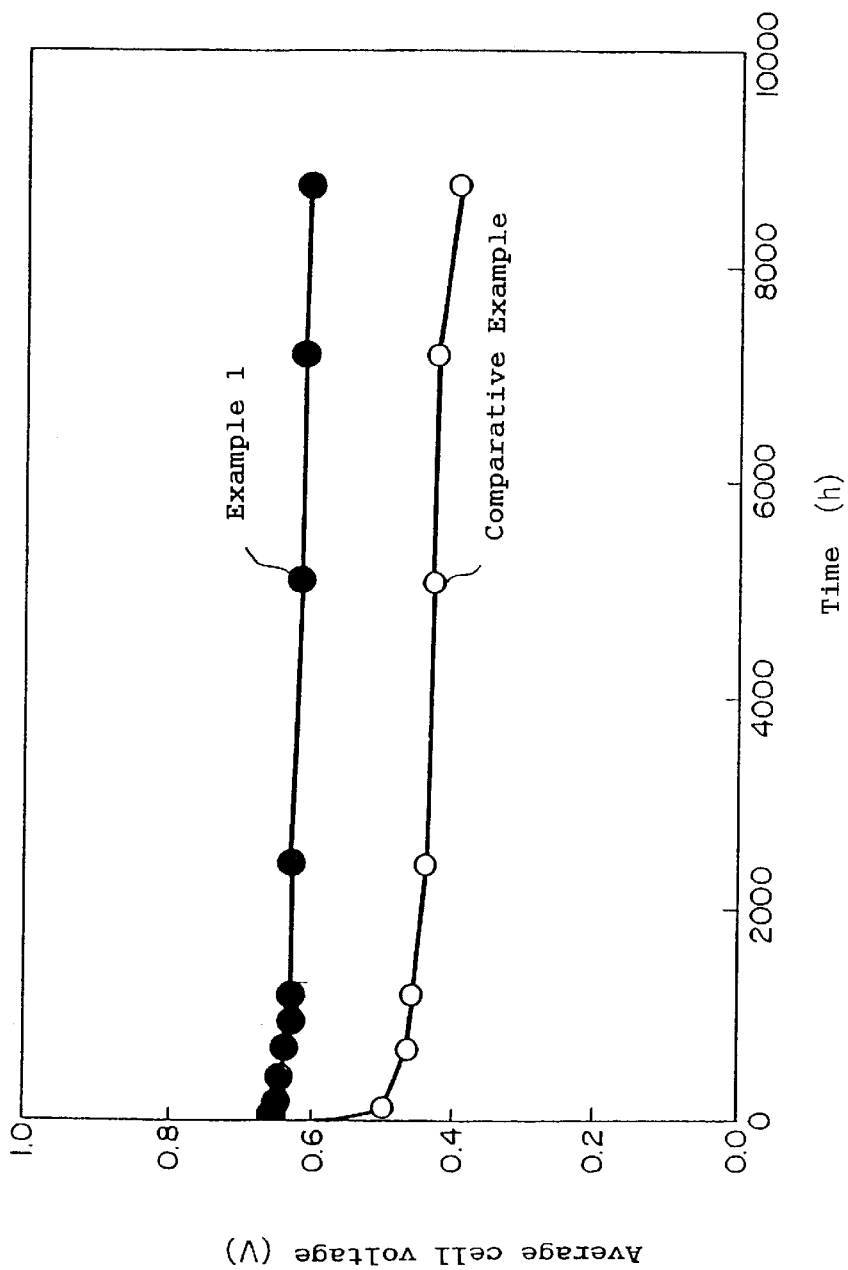
FIG. 4 is a graph showing variances with time in the average cell voltage of fuel cells obtained in Example 1 and Comparative Example 1.

Further, the variances with time of the cell voltage of the cell of this example at a current density of 0.4 A/cm$^2$ were evaluated. The result is shown in FIG. 4. FIG. 4 shows that the cell of Comparative Example 1 has a decreased output along with the operation time, however the cell of this example maintains an excellent characteristics for a long time. The reason for this is considered that the diffusion layer subjected to the water repelling treatment with a silane compound has a very good water-repelling property, and the adhesion to the diffusion layer is extremely high, and therefore a high reliability may be maintained for a long time.

Example 2

In this example, the same cell as the cell of Example 1 was produced except that the water-repelling treatment with a 5% by weight solution of $CF_3(CF_2)_7(CH_2)_2Si(OCH_3)_3$/methanol was carried out.

The water-repelling treatment was carried out in the following manner. The non-woven carbon fabric electrodes 5 as shown in FIG. 1 were subjected to the plasma treatment at 300 W for about 5 minutes to be provided with a hydroxyl group containing activated hydrogen. Next, a 5% by weight solution of $CF_3(CF_2)_7(CH_2)_2Si(OCH_3)_3$/methanol was prepared, and the non-woven carbon fabric electrodes 5 were impregnated therewith and dried at room temperature for 1 hour. Subsequently, they were sintered at 100° C. for 15 minutes, and thereby a water-repelling layer comprising $CF_3(CF_2)_7(CH_2)_2Si(OCH_3)_3$ having a covalent bond with siloxane bond was formed on the non-woven carbon fabric electrodes 5.

The current-voltage characteristics of this example is shown in FIG. 3. As the cell for the evaluation of characteristics, a cell stack of 10 unit cells was used in the same manner as in Example 1. FIG. 3 shows that the cell of this example maintains a high performance even when the output took place at a high current density.

Example 3

FIG. 5 is a schematic longitudinal cross-sectional view showing the configuration of a unit cell of a fuel cell prepared in this example.

A carbon powder having a particle diameter of several microns or less was impregnated with a platinum chloride acid solution so as to make a platinum catalyst to be carried on the carbon powder surface by reduction treatment. The weight ratio of carbon to platinum carried was about 1:1.

As a water-repelling agent for the catalyst layers 21, fluorinated graphite was used. The fluorinated graphite was a compound of fluorine and carbon combined at a ratio of about 1:1, and it had a contact angle with water of about 143°. The fluorinated graphite was mixed at 5% by weight with the platinum-carrying carbon powder, a solvent mainly composed of ethyl alcohol was added thereto, and the resulting mixture was kneaded to be prepared as an ink.

On the other hand, a carbon paper having a thickness of 500 microns serving as an electrode base material 22 was impregnated with an organic solvent dispersing ultrasonically the same fluorinated graphite as above and dried to be provided with water-repelling property. The ink containing the platinum-carrying carbon and the fluorinated graphite was uniformly applied onto one surface of the electrode base material subjected to the water-repelling treatment and dried, and thereby a catalytic layer 21 was formed.

Matrix material 23 made of a porous SiC plate was impregnated with about 96% by weight polyphosphoric acid. A pair of electrodes with the above-mentioned catalytic layer formed thereon were made to adhere to the above SiC plate from both surfaces. Further, a pair of separator plates 24 comprising ribbed carbon plates provided with gas flow grooves for supplying reaction gas to the catalytic layer and exhausting generated gas were made to sandwich the electrodes, and thus a unit cell was configured.

Next, a heater for controlling the cell temperature to about 200° C., an insulating material and a device for supplying the reaction gas were connected. Measurements were carried out while adjusting the pressure of the supplied gas to an atmospheric pressure, and the performance was compared with that of the conventional cell using PTFE as the water-repelling agent.

Figure 7:
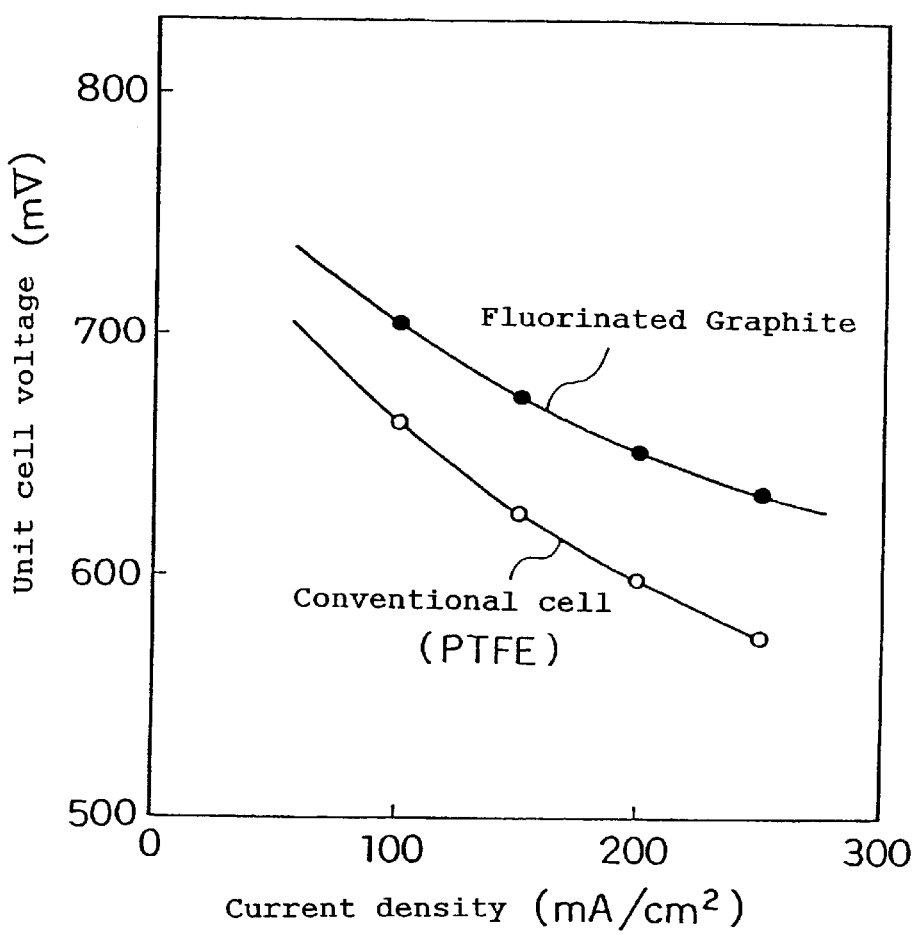
FIG. 7 is a graph showing initial performances of a fuel cell prepared in Example 3 and a conventional cell.

As shown in FIG. 7, as the intial performance, the conventional cell had 600 mV–200 mA/cm$^2$, whereas the cell of the invention had 650 mV–200 mA/cm$^2$, which was a great deal of improvement in the performance. The reason for this is considered that since the carbon fluoride had a contact angle as great as 143° compared with PTFE having a contact angle to water of about 110°, the three phase zone serving as the catalytic layer where the electrode reaction takes place was not too moistened with the phosphoric acid electrolyte solution and the generated water, and was maintained in a good condition.

Example 4

Water-repelling agents having a large contact angle to water and readily adhering and fixing to the surface to be treated were examined in place of the fluorinated graphite. As fluoric organic materials soluble in a solvent, polyvinylidene fluoride and a pitch subjected directly to fluoridation were selected.

As a result of the experiment, the polyvinylidene fluoride had a contact angle of about 100°, whereas the pitch had a contact angle of 145° at maximum. Further, while a solution of polyvinylidene fluoride had a high viscosity and was difficult to handle, a solution dissolving the pitch into a solvent of perfluorobenzene, for example, had a relatively low viscosity and was easy to handle. This is presumably because the molecule is not polymeric and is in the form of a mass. In addition, it has high water-repelling property presumably because the higher cyclic hydrocarbon has a long fluorine atom-containing carbon chain which is superior in the water-repelling property.

Typical pitch used in this example was a white powder and was obtained by directly fluorinating an oil type pitch. The reaction temperature was set to about 60 to 120° C. and the reaction time was 4 to 12 hours.

The pitch fluorinated as above was dissolved in perfluorobenzene as the solvent, mixed into a platinum catalyst-carrying carbon powder and dried. The platinum catalyst-carrying carbon powder was thus provided with water-repelling property. In the same manner, the perfluorobenzene solution of the pitch was impregnated into the electrode base material and dried to give water-repelling property to the electrode base material. When the state of adhesion and fixation of the hydrocarbon, which constitutes the pitch, was observed by the microscope, it was confirmed that it was melt and adhered firmly to the treated surface. Herein, FIG. 6 is a schematic view showing the constitution of the catalytic layer of the electrode of the fuel cell prepared in Example 3. As shown in FIG. 6, carbon powder 25 carrying platinum catalyst 26 and fluorinated graphite 27 are melt and adhered, uniformly dispersed.

Figure 8:
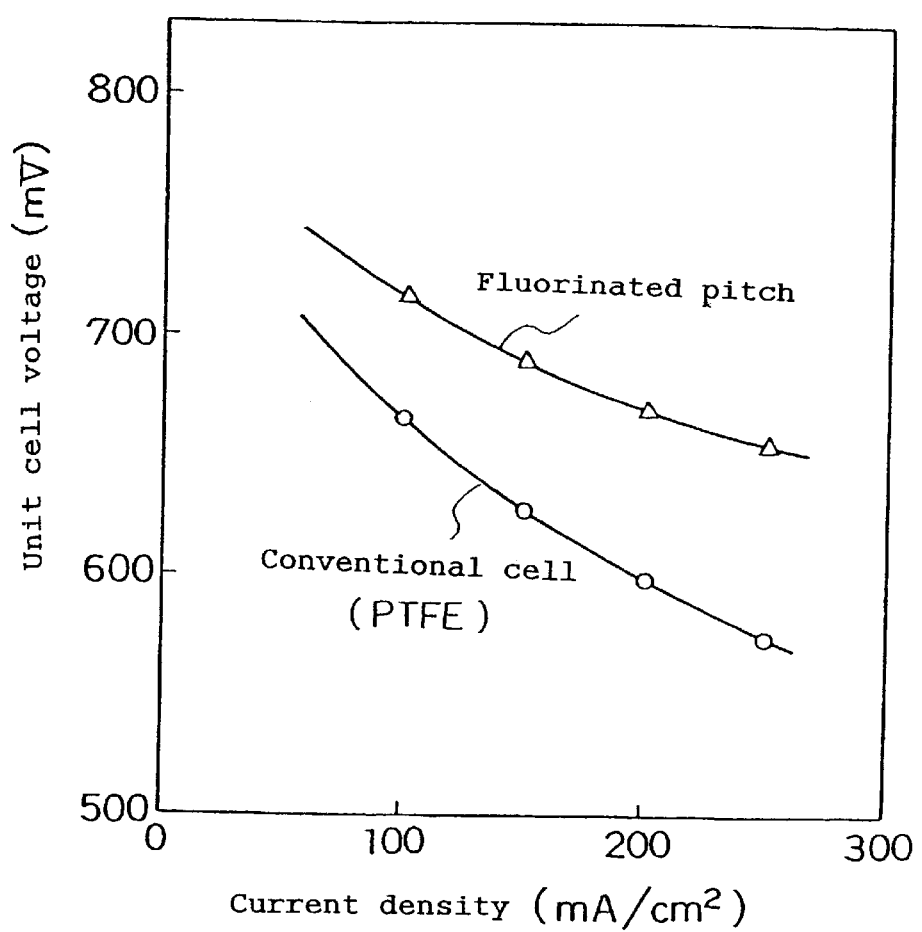
FIG. 8 is a graph showing performances of a solid polymer electrolyte fuel cell prepared in Example 4 and a conventional cell.
Figure 9:
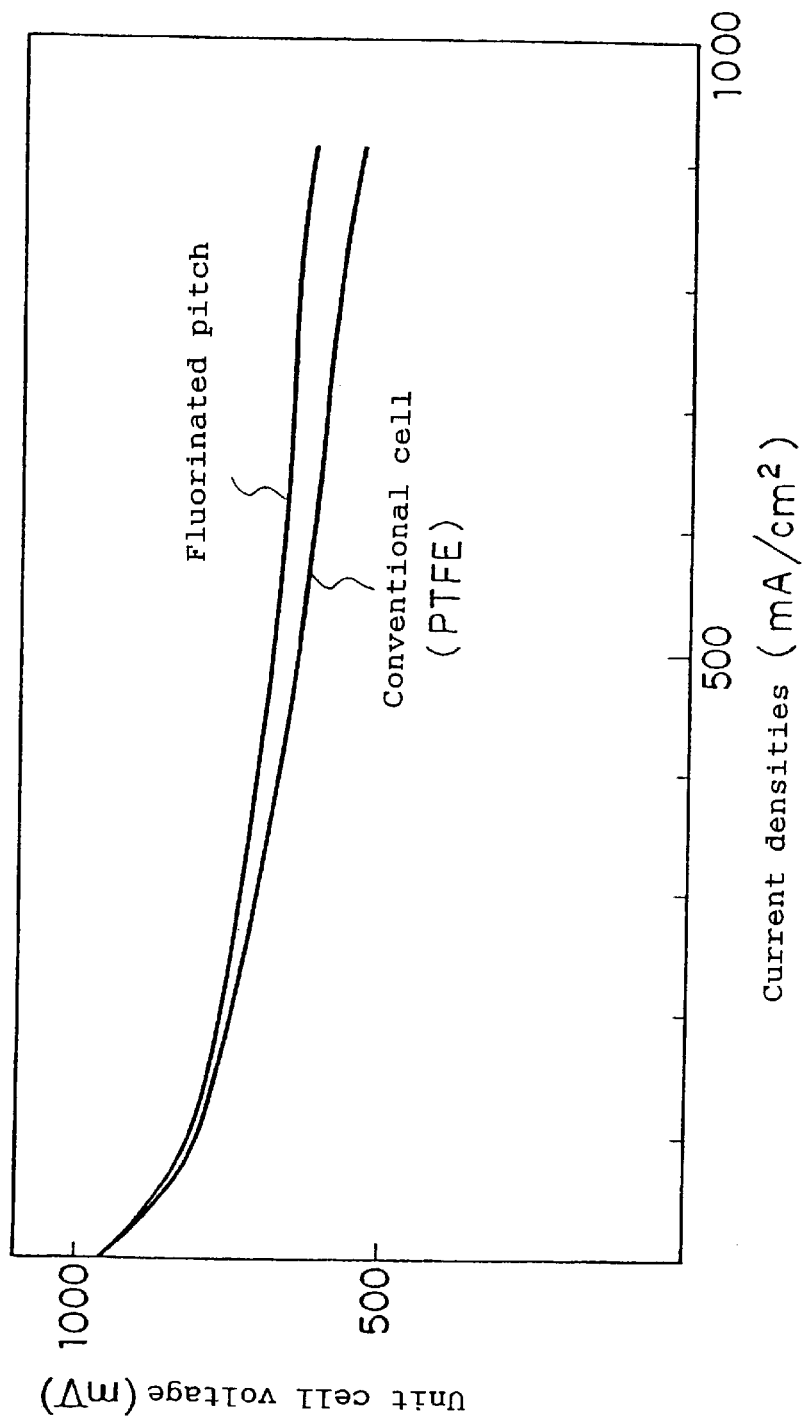
FIG. 9 is a graph showing performances of a solid polymer electrolyte fuel cell prepared in Example 5 and a conventional cell.

Using fluorinated pitch synthesized under different conditions, phosphoric acid type fuel cells were configured, each subjected to water-repelling treatment at 5% by weight on the catalytic layer and 10% by weight on the electrode base material (namely, gas diffusion layer). In FIG. 8, a cell using, as a typical pitch, those using oil type pitch as a raw material and having an average molecular weight of about 2000, the ratio of fluorine to carbon (F/C) of about 1.4, and the ratio of fluorine to hydrogen (F/H) of about 12, was shown for the cell performance in comparison with the conventional cell using PTFE.

For initial performances, the conventional cell had 600 mV–200 mA/cm$^2$, whereas the cell of the invention had a remarkably improved performance of 670 mV–200 mA/cm$^2$. Moreover, a decrease in the performance was not observed even after 100 hours of operation.

Next, in order to optimize fluorinated pitch, experiments were carried out using a variety of fluorinated pitches having different raw materials, molecular weight and component elements, and the following results were obtained.

Namely, as the raw materials, oil type pitch was good in addition to coal type pitch, and as the average molecular weight, the cell having 500 to 10000 had better performance than the cell using the conventional PTFE. As the F/C ratio, 1.25 to 1.65 was preferable, and as the F/H ratio, 9 or more was preferable. Further, as the contact angle, 130 or greater exhibited a remarkable improvement in the performance. Moreover, the molecular structure was examined by known analyzing methods such as X-ray diffraction and NMR method, those which had remarkably improved performance when used as the water-repelling agent was found to have a plane structure in which the carbon skeleton is essentially consisting of stacked 6 ring members.

Example 5

As a cell in which water-repellency control is important, in addition to the phosphoric acid type fuel cell as described in the previous examples, the solid polymer electrolyte fuel cell was also evaluated. The solid polymer electrolyte fuel cell contains water in fluorine type electrolyte membrane and the amount of the water therein greatly influences the performance, and therefore water-repellency control is considered to be more important.

As a water-repelling agent for the catalytic layer of the electrode, a platinum-carrying carbon powder further coated with the fluorinated pitch was kneaded in an alcoholic solution of the electrolyte membrane and prepared into a slurry. Then, carbon paper serving as an electrode base material was subjected to the water-repelling treatment with the same fluorinated pitch. The above-mentioned slurry containing the carbon powder was uniformly applied on one surface of the carbon paper to form a catalytic layer. Thus, 2 pieces of electrodes comprising a carbon paper with the catalytic layer formed thereon were made to sandwich a solid polymer electrolyte membrane with respective catalytic layer directed inward and, then, dried to produce MEA. The 2 pieces of electrodes comprising a carbon paper were made to have a length and a thickness of both 10 cm and were placed in the center of the polymer electrolyte membrane having a length and a thickness of both 12 cm. Carbon separator plates having air-tightness were made to sandwich this MEA on both sides thereof to configure a unit cell.

As a result of the cell performance test, The conventional cell using PTFE had 600 mV–700 mA/cm$^2$, whereas the cell of the invention had a remarkably improved performance of 650 mV–700 mA/cm$^2$.

In the phosphoric acid type fuel cell as well as the solid polymer electrolyte fuel cell used in the examples on the foregoing, the water-repelling treatment using a new water-repelling agent was done both on the catalytic layer and the electrode base material (namely, gas diffusion layer), however an effect to some extent is achieved by treating only one of them. In addition, it is considered effective to carry out the water-repelling treatment on grooves on the separators serving as the gas flow paths and on manifold ports.

Example 6

In Examples 3 to 5, a method in which water-repelling agents dispersed in alcohol or dissolved in perfluorobenzene are impregnated into the material subjected to water-repelling treatment and dried. On the other hand, considering the function of the three phase zone in the catalyst portion on the electrodes, further local water-repelling treatment is considered preferable.

Moreover, hydrocarbon contained in the fluorinated pitch is an organic material but not polymeric, and therefore it sublimates. Thus, a cell was produced as an experiment by heating and vapor-depositing the pitch on various constitutional surfaces of a polymer electrolyte fuel cell. The portions which were subjected to the water-repelling treatment by vapor deposition of the pitch were the surface of the gas flow path side of the electrodes, the surface of the catalytic layer side of the electrode base materials (i.e. the surface between the catalytic layer and the gas diffusion layer), and the surface in which the catalytic layer after the application and drying comes into contact with the polymer electrolyte membrane. As a result of the cell test, the one subjected to the water-repelling treatment on the catalytic layer side surface of the electrode base material had the best effect.

INDUSTRIAL APPLICABILITY

According to the present invention, at least one portion of the catalytic layer, the gas diffusion layer and the flow path constituting a fuel cell is provided with excellent water-repelling properties, which enables to provide a fuel cell exhibiting a superior cell performance.

What is claimed is:

1. A fuel cell comprising stacked unit cells, each of the unit cells including a pair of electrodes having a catalytic reaction layer and a gas diffusion layer, a polymer electrolyte membrane disposed between said pair of electrodes, a separator having a flow path for supplying a fuel gas to one of the electrodes and a separator having a flow path for supplying an oxidant gas to the other electrode, said separators being placed on the outer side of said electrodes and said unit cells being stacked with said separators placed therebetween, wherein said catalytic reaction layer and said gas diffusion layer have a water-repelling property from application of a water-repelling agent containing a non-polymeric compound containing a fluorine atom and a carbon atom.

2. The fuel call in accordance with claim 1, wherein said water-repelling agent containing a non-polymeric compound containing a fluorine atom and a carbon atom comprises a fluorinated graphite or fluorinated pitch.

3. The fuel cell in accordance with claim 2, wherein said fluorinated pitch has an average molecular weight of 500 to 10,000.

4. The fuel cell in accordance with claim 2, wherein a ratio of fluorine atom to carbon atom (F/C) contained in said fluorinated pitch is from 1.25 to 1.65.

5. The fuel cell in accordance with claim 2, wherein a ratio of fluorine atom to hydrogen atom (F/H) contained in said fluorinated pitch is 9 or over.

6. The fuel cell in accordance with claim 2, wherein a contact angle of said fluorinated pitch to water is 130° or greater.

7. A method for producing a fuel cell comprising stacked unit cells, each of the unit cells including a pair of electrodes having a catalytic reaction layer and a gas diffusion layer, a polymer electrolyte membrane disposed between said pair of electrodes, a separator having a flow path for supplying a fuel gas to one electrode and a separator having a flow path for supplying an oxidant gas to the other electrode, said separators being placed on the outer side of the electrodes and said unit cells being stacked with the separators stacked therebetween, said method comprising the steps of (a) applying a water-repelling agent containing a non-polymeric compound containing a fluorine atom and a carbon atom to at least a material, which constitutes said catalytic reaction layer and said gas diffusion layer; and (b) adhering and fixing said non-polymeric compound by drying.

* * * * *